United States Patent
Bergström et al.

(10) Patent No.: US 10,805,820 B2
(45) Date of Patent: Oct. 13, 2020

(54) METHOD AND APPARATUS FOR INTERFERENCE DETECTION AND REPORTING IN A WIRELESS COMMUNICATION NETWORK

(71) Applicant: Telefonaktiebolaget LM Ericsson (publ), Stockholm (SE)

(72) Inventors: Mattias Bergström, Stockholm (SE); Sebastian Euler, Storvreta (SE); Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 75 days.

(21) Appl. No.: 16/082,971

(22) PCT Filed: Jun. 26, 2018

(86) PCT No.: PCT/SE2018/050682
§ 371 (c)(1),
(2) Date: Sep. 7, 2018

(87) PCT Pub. No.: WO2019/004908
PCT Pub. Date: Jan. 3, 2019

(65) Prior Publication Data
US 2020/0100127 A1 Mar. 26, 2020

Related U.S. Application Data

(60) Provisional application No. 62/527,308, filed on Jun. 30, 2017, provisional application No. 62/527,099, filed on Jun. 30, 2017.

(51) Int. Cl.
*H04W 24/10* (2009.01)
*H04W 48/16* (2009.01)
*H04W 16/18* (2009.01)

(52) U.S. Cl.
CPC .......... *H04W 24/10* (2013.01); *H04W 16/18* (2013.01); *H04W 48/16* (2013.01)

(58) Field of Classification Search
CPC . H04W 16/18; H04W 24/10; H04W 28/0231; H04W 48/16
See application file for complete search history.

(56) References Cited

U.S. PATENT DOCUMENTS 9,537,561 B1 * 1/2017 Kotecha .................. H04W 8/00
9,686,729 B2 * 6/2017 Zingler .............. H04W 36/0083
(Continued)

OTHER PUBLICATIONS

KDDI, "Proposal of potential LTE enhancements for Ariel Vehicles" 3GPP TSG-RAN2 Meeting #98, Hangzhou, China, May 15-19, 2017 (Year: 2017).*

(Continued)

*Primary Examiner* — Brian P Cox
(74) *Attorney, Agent, or Firm* — Murphy, Bilak & Homiller, PLLC

(57) ABSTRACT

A radio network node (12) in a wireless communication network (10) configures a wireless device (30) to send a measurement report responsive a determination by the device (30) that its current network coverage condition matches a predefined coverage condition that is characteristic of airborne operation of the device (30) at the current location of the device (30). As advantageously recognized herein, the network coverage condition experienced by the wireless device (30) at its current location changes as it rises above ground level. By configuring die device (30) to send a measurement report when its network coverage condition satisfies a coverage condition that, for the current location of the device (30), is characteristic of airborne operation, the network (10) effectively defines a mechanism for detecting airborne operation of the device and making one or more (Continued)

control decisions for the device (30), e.g., to limit network interference experienced or caused by the device (30).

14 Claims, 4 Drawing Sheets

(56) References Cited

U.S. PATENT DOCUMENTS

| | | | | |
|---|---|---|---|---|
| 10,172,075 | B1* | 1/2019 | Singh | H04W 48/16 |
| 2006/0217851 | A1* | 9/2006 | McGuffin | H04B 7/18506 |
| | | | | 701/4 |
| 2009/0245176 | A1* | 10/2009 | Balasubramanian | ......... |
| | | | | H04W 48/20 |
| | | | | 370/328 |

OTHER PUBLICATIONS

Unknown, Author, "Potential Enhancements for HO", 3GPP TSG-RAN WG2 Meeting #98, R2-1705427, Ericsson, Hangzhou, China, May 15-19, 2017, 3 pages.

Unknown, Author, "Proposal of Potential LTE Enhancements for Aerial Vehicles", 3GPP TSG-RAN2 Meeting #98, R2-1705999, KDDI, Hangzhou, China, May 15-19, 2017, 6 pages.

Huawei, et al., "Requirements of Connectivity with Cellular Networks for Drones", 3GPP TSG RAN WG1 Meeting #88bis, R1-1704286, Huawei, HiSilicon, Spokane, USA, Apr. 3-7, 2017, 4 pages.

* cited by examiner

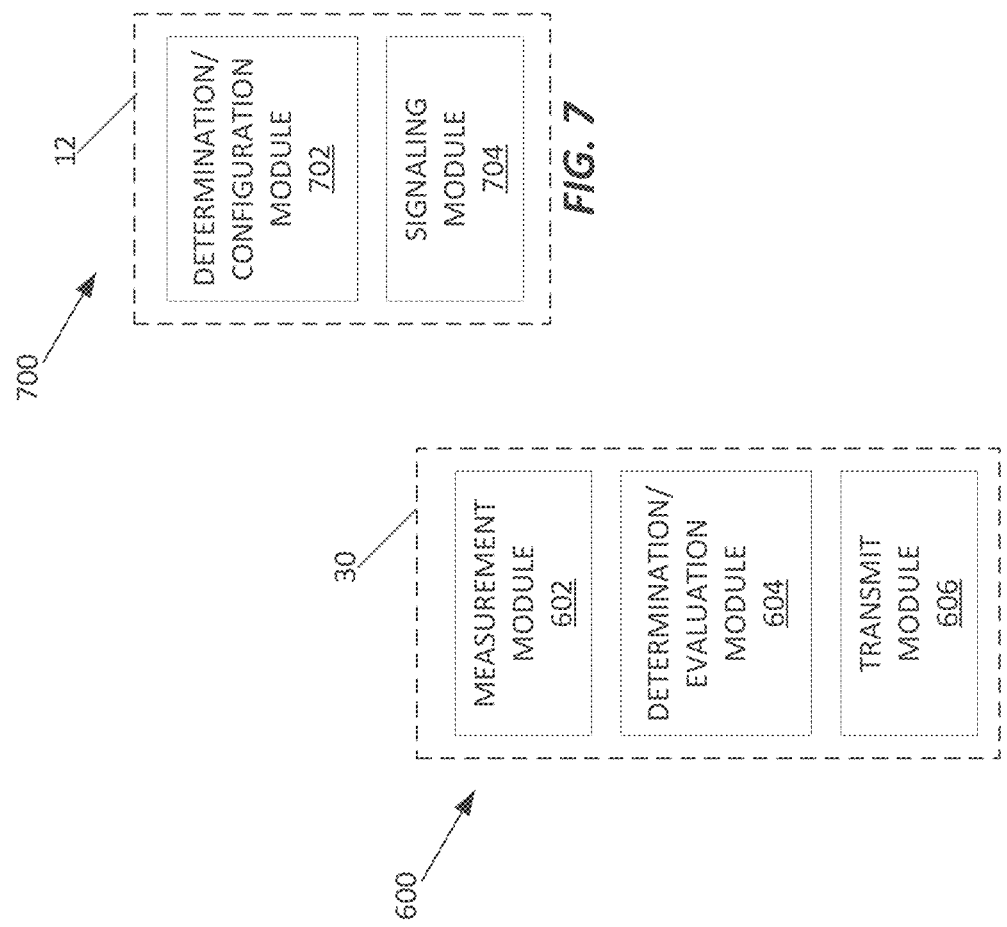
FIG. 7
FIG. 6
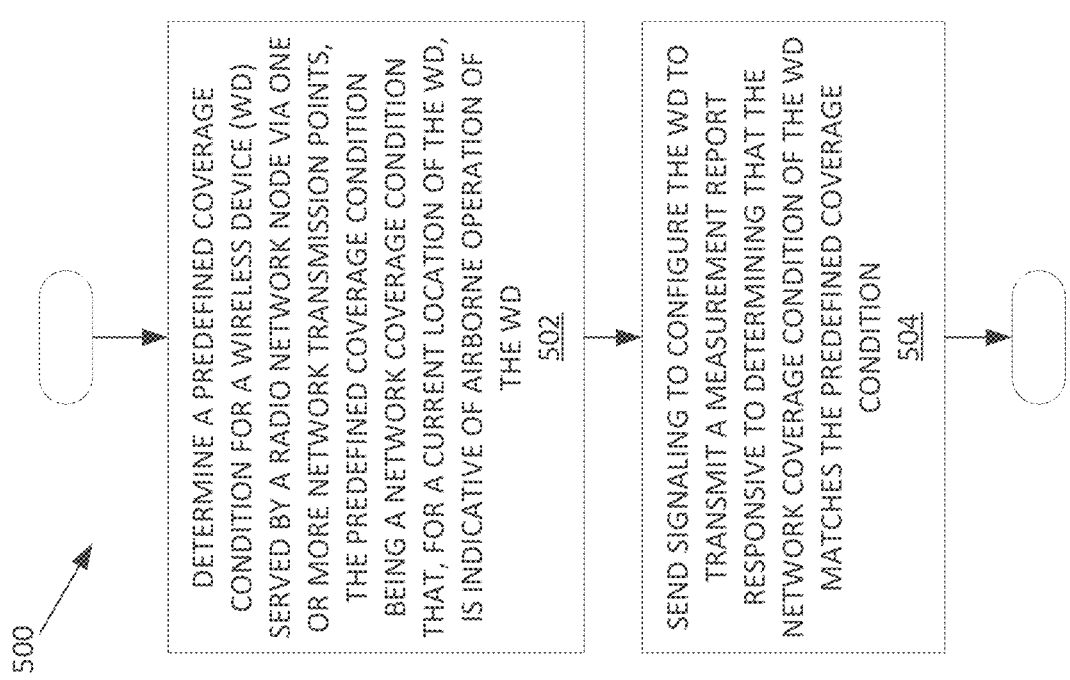
FIG. 5

METHOD AND APPARATUS FOR INTERFERENCE DETECTION AND REPORTING IN A WIRELESS COMMUNICATION NETWORK

TECHNICAL FIELD

The present invention relates to interference detection and reporting in a wireless communication network.

BACKGROUND

A typical wireless communication network includes multiple transmission points, each having a corresponding coverage area or areas, for providing communication services to wireless communication devices. Hie network serves a given device on the downlink from one or more transmission points, e.g. one or more network base stations currently offering the best radio connection to the device. Likewise, one or more network receivers, e.g. at the same base stations, serve the device on the uplink, and are responsible for receiving and processing uplink transmissions from the device.

The arrangement of base stations or other equipment providing the downlink transmission points and uplink reception points in the network may be configured on the assumption that the wireless devices served by the network operate at ground level. Thus, the layout of cells, beam patterns, or other coverage areas, the neighbor relationships between coverage areas, and the management of uplink or downlink interference between coverage areas, all may be predicated on the assumption that the wireless devices served by the network will be operated at ground level.

FIG. 1 illustrates an example network arrangement based on the assumption of ground-level operation of the wireless devices served by the network. The diagram depicts three transmission points, TP1, TP2, and TP3. While not to scale, the figure shows that TP3 is further away from TP1, as compared to TP2, and shows that the main lobe of the downlink antenna radiation pattern from TP1 extends towards TP2 and vice versa. The main lobes are tilted for ground-based coverage.

A wireless device operating at ground level in the coverage area of TP1 would be expected to "see" TP2 as it moves towards TP2 but would not be expected to see TP3. Here, the term "see" denotes the wireless device receiving one or more downlink signals, e.g., reference or sync signals, from a transmission point with a strength or quality above some minimum detection threshold. However, an airborne wireless device hovering or flying above the geographic area covered by TP1 may see both TP2 and TP3, or may see TP3 without seeing TP2, depending on the height of the device and the radiation patterns and orientations of the antennas constituting the involved transmission points.

For certain antenna radiation patterns and operating heights, the device may experience a weakened or last signal with respect to TP1 and may experience stronger than normal signals with respect to one or more other TPs, e.g., TP2 and TP3. Here, "normal" refers to what would be expected for ground-based operation of the device at the corresponding geographic location.

More broadly, it is recognized herein that as a wireless device ascends its network coverage condition may change radically as compared to ground operation at the same location. Thus, the increasing use of drones and other airborne equipment in cellular and other wide-area radio networks raises interesting coverage and interference challenges.

SUMMARY

A radio network node configures a wireless device to send a measurement report responsive determining that its current network coverage condition matches a predefined coverage condition, where the predefined coverage condition is characteristic of airborne operation of the device at the current location of the device. In an example case, a wireless device operating at ground level at a certain geographic location would be expected to detect specific transmission points within expected ranges of relative or absolute signal measurement values. As advantageously recognized herein, the network coverage condition experienced by the wireless device at its current location changes as it rises above ground level. By configuring the device to send a measurement report when its network coverage condition satisfies a coverage condition that, for the current location of the device, is characteristic of airborne operation, the network effectively defines a mechanism for detecting airborne operation of the device. Detecting airborne operation allows the network to make more intelligent control decisions for the device, e.g., to limit network interference experienced or caused by the device.

An example method in a wireless device configured for operation in a wireless communication network includes evaluating signals received at the wireless device from one or more respective transmission points in the network that are currently detected by the device, to determine whether a network coverage condition currently experienced by the wireless device satisfies a predefined coverage condition that is characteristic of airborne operation of the device. Of course, the device may not "know" that the predefined coverage condition is characteristic of airborne operation; instead, it need only be configured to evaluate the network coverage conditions it experiences against the predefined coverage condition, which may be specified to the device in configuration signaling received from die network.

The example device method further includes, in response to determining that the predefined coverage condition is satisfied, generating a measurement report indicating satisfaction of the predefined coverage condition, and transmitting the measurement report to the wireless communication network. For example, the device transmits the measurement report to the radio network node currently serving it. Sending the measurement report, on a triggered basis, i.e., in response to determining that the current network coverage condition at the device satisfies the predefined coverage condition, provides the network with a timely mechanism for detecting, or at least surmising, airborne operation of the device.

An example wireless device is configured for operation in a wireless communication network and includes radio circuitry configured to receive signals from the network and transmit signals to the network, and further includes processing circuitry that is operatively associated with the radio circuitry and configured to evaluate signals received at the device from one or more respective transmission points in the network that are currently detected by the device, to determine whether a network coverage condition currently experienced by the device satisfies a predefined coverage condition that is characteristic of airborne operation of the device. The processing circuitry is further configured to generate a measurement report, indicating satisfaction of the predefined coverage condition, in response to determining that the predefined coverage condition is satisfied, and to transmit the measurement report to the wireless communication network via the radio circuitry.

Another example method involves a radio network node configured for operation in a wireless communication network having a plurality of transmission points used for serving wireless devices. The method performed by the radio network node includes determining a predefined coverage condition fora wireless device served by the radio network node via one or more of the transmission points. The predefined coverage condition is a network coverage condition that, for a current location of the wireless device, is indicative of airborne operation of die device. In this context, the network coverage condition of the device at any given time is defined by which transmission points of the network are detected by the device and by the relative or absolute values of received signal measurements made by the device for the detected transmission points. The method further includes sending signaling to configure the device to transmit a measurement report responsive determining that the network coverage condition of the device satisfies the predefined coverage condition.

An example radio network node is configured for operation in a wireless communication network having a plurality of transmission points for serving wireless devices. The radio network node includes radio circuitry configured to send signals via one or more of the transmission points for reception by wireless devices operating in a coverage area of the radio network node, and receive signals transmitted from such wireless devices. Further, the radio network node includes processing circuitry that is operatively associated with the radio circuitry.

The processing circuitry is configured to determine a predefined coverage condition for a wireless device served by the radio network node via one or more of the transmission points. The predefined coverage condition is a network coverage condition that, for a current location of the wireless device, is indicative of airborne operation of the device. In this context, the network coverage condition of the device at any given time is defined by which transmission points of the network are detected by the device, and by the relative or absolute values of received signal measurements made by the device for the detected transmission points. The processing circuitry is further configured to send signaling to configure the device to transmit a measurement report responsive determining that the network coverage condition of the device satisfies the predefined coverage condition.

As such, a radio network node according to at least some embodiments disclosed herein can be understood as configuring a given wireless device to send a measurement report upon the device experiencing a network coverage condition at its current location that should not be experienced during ground level operation of the device, and instead corresponds to some combination of detected transmission points and corresponding signal measurements that would be expected for the device at a certain elevation or range of elevations above ground level. The radio network node may be provisioned with, or otherwise have access to, a database or other information store that contains or otherwise defines the predefined coverage conditions. Such information may be organized according to the respective coverage areas—geographic locations or regions—associated with the respective transmission points in the network and may be further organized in terms of elevations or ranges of elevations. It will be understood that, the information may reflect field measurements obtained for various locations at various elevations or ranges of elevation.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a logic flow diagram of an embodiment of a method of operation at a radio network node operating in a wireless communication network, such as in the example network of FIG. 2.

FIG. 6 is a block diagram of an example modular or functional arrangement for a wireless device.

FIG. 7 is a block diagram of an example modular or functional arrangement for a radio network node.

DETAILED DESCRIPTION

Figure 2:
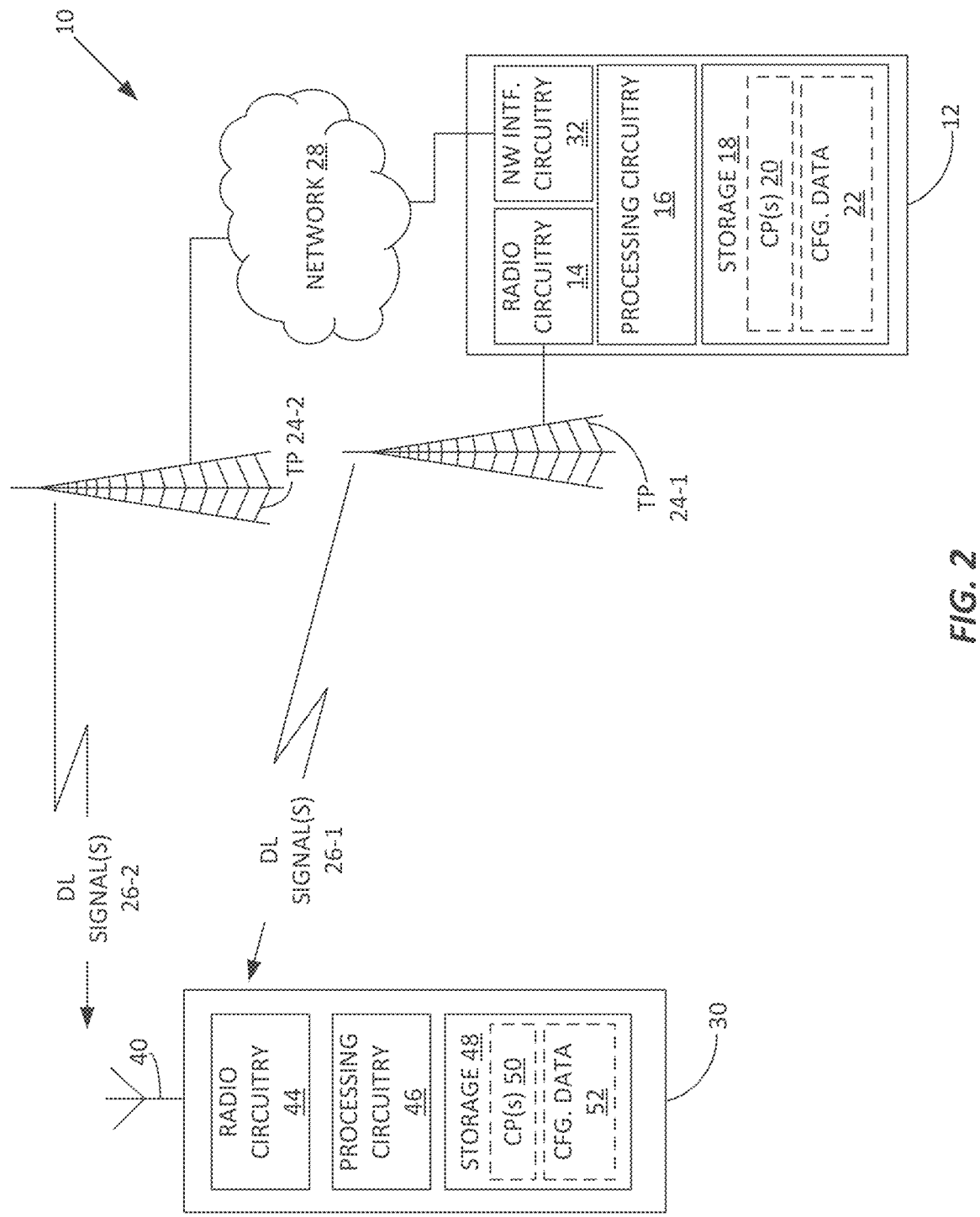
FIG. 2 is a block diagram of one embodiment of a w ireless communication network as contemplated herein.

Although the device and node arrangements and corresponding operations described herein may be implemented in any appropriate type of communication system using any suitable components, particular embodiments of the described solutions may be implemented in the example wireless communication network 10 illustrated in FIG. 2. In the example embodiment of FIG. 2, the network 10 includes one or more radio network nodes 12, each including radio circuitry 14, e.g. one or more radiofrequency transmitters and receivers, processing circuitry 16, and storage 18, e.g., a computer-readable medium or media storing one or more computer programs 20 for execution by the processing circuitry 16, along with storing relevant configuration data 22.

Figure 1:
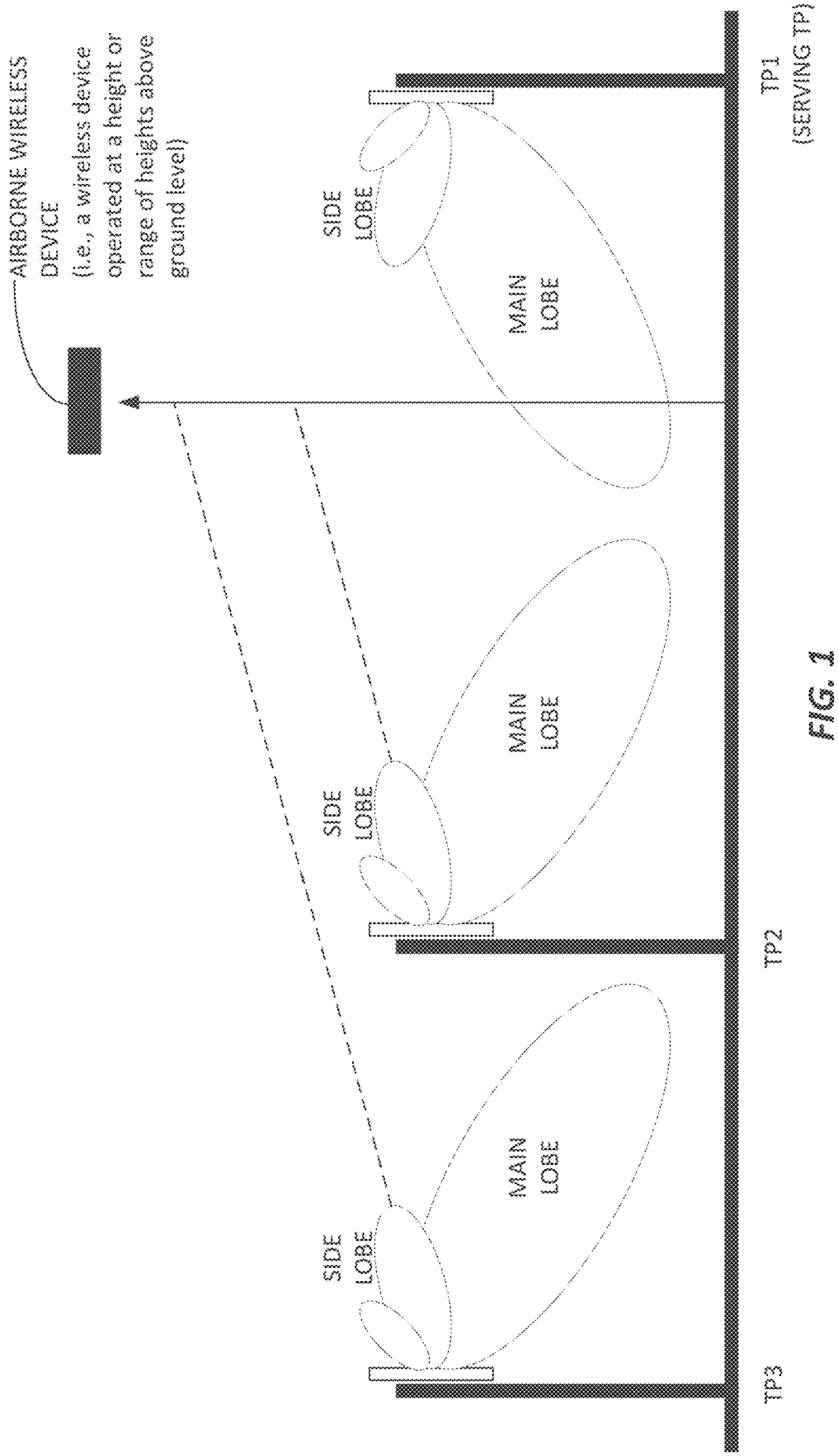
FIG. 1 is a diagram of a typical arrangement and orientation of transmission points in a wireless communication network.

The example radio network node 12 includes or is associated with one or more transmission points 24 in the network 10. For example, the radio network node 12 is a base station with locally connected transmit and receive antennas. Additionally, or alternatively, the example radio network node 12 controls a distributed antenna system or one or more remote radio heads that operate as respective transmission points 24 in the network 10. FIG. 1 illustrates two transmission points 24-1 and 24-2 but the network 10 may include a potentially large plurality of transmission points 24, with individual radio network nodes 12 including or otherwise controlling one or more such transmission points 24. Correspondingly, the network 10 may include one or more subordinate networks 28 for interconnection and control of the various nodes comprising the overall network 10, and for connecting wireless devices 30 to various communication services, e.g., the Internet, the Public Switched Telephone Network (PSTN), etc.

It should be understood that die network 10 may include many nodes of varying types and that FIG. 2 offers a simplified depiction for ease of discussion. Correspondingly, the network 10 may represent essentially any type of communication, telecommunication, data, cellular, and/or radio network or other type of system that provides one or more communication services to wireless devices 30, via wireless connectivity between the devices 30 and respective ones of the various radio network nodes 12 deployed in the network 10. Example network types include those implemented using communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, and/or ZigBee standards.

As used herein, "radio network node" or "network node" refers to equipment capable, configured, arranged and/or operable to communicate directly or indirectly with a wireless device and/or with other equipment in the network 10 that enables and/or provides wireless access to given wireless devices 30 operating in the network 10. Examples of radio network nodes 12 include, but are not limited to, wireless access points (APs) or radio base stations, such as Node Bs, evolved Node Bs (eNBs), as known from Third Generation Partnership Project (3GPP) specifications. Further examples include access nodes configured for use in New Radio (NR) systems under development for 5G networks.

Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay. Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes. Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

While FIG. 2 illustrates a radio network node 12 as a consolidated system or "box", it should be appreciated that a radio network node 12 may be implemented in a distributed fashion, and at least some portion of its operations may be virtualized. Further, in certain scenarios in which the network node 12 comprises multiple separate components (e.g., a Base Transceiver Station (BTS) and Base Station Controller (BSC) components), one or more of the separate components may be shared among several network nodes. For example, a single Radio Network Controller (RNC) may control multiple base stations, e.g., multiple NodeBs. In such a scenario, each unique NodeB and BSC pair may be considered a separate radio network node 12. In some embodiments, a radio network node 12 is configured to support multiple radio access technologies (RATs). In such embodiments, some components may be duplicated (e.g., separate storage 18 for the different RATs) and some components may be reused (e.g., the same antennas may be shared by two or more RATs). As such, a given transmission point 24, which may also function as or be co-located with a corresponding reception point for receiving signals from wireless devices 30, may transmit signals for two or more different RATs.

The processing circuitry 16 in one or more embodiments comprises one or more microprocessors, controllers, microcontrollers, central processing units, digital signal processors, application specific integrated circuits, field programmable gate arrays, or any other suitable processing circuitry. In an example embodiment the processing circuitry 16 comprises one or more digital processors that are configured to operate in the manner detailed herein, based at least in part on executing computer program instructions stored in the storage 18.

The storage 18 may comprise, any form of volatile or non-volatile computer readable media including, without limitation, persistent storage, solid state memory, remotely mounted memory, magnetic media, optical media, random access memory (RAM), read-only memory (ROM), removable media, or any other suitable local or remote memory component. Storage 18 may store any suitable computer program instructions, configuration data or information, including software and encoded logic, utilized by the radio network node 12. The storage 18 may include a mix of volatile working memory for ongoing computational use by the processing circuitry 16, and may include non-volatile memory or other storage, for persistent storage of program instructions and configuration data.

The radio network node 12 in one or more embodiments also includes interface circuitry 32 that is configured to communicatively couple the radio network node 12 to one or more other nodes of the same or varying types in the network 10, e.g., for exchanging or receiving information. Such information comprises, for example, user traffic received at the radio network node 12 via the network 28, for transmission to given wireless devices 30, user traffic received at the radio network node 12 via radio reception from given wireless devices 30, for transfer to the network 28. Additionally, the radio network node 12 may receive configuration information or data, e.g., information comprising the configuration data 22 or information used by the radio network node 12 to determine the configuration data 22.

The transmission point(s) 24 in one or more embodiments comprise one or more antennas or antenna systems, which are configured for transmission of wireless signals to wireless devices 30 and for reception of wireless signals from wireless devices 30. As noted, a radio network node 12 may integrate a transmission point 24, or may control one or more transmission points 24, one or more of which may be remote from the radio network node 12. Regarding the antenna(s) included in a given transmission point 24, such antennas may be any type of antenna capable of transmitting and receiving data and/or signals wirelessly. In some embodiments, the transmission-point antenna(s) comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a fine of sight antenna used to transmit/receive radio signals in a relatively straight line.

Correspondingly, in at least some embodiments, each transmission point 24 may be understood as being associated with one or more geographic locations or areas for which the transmission point 24 is configured to provide radio coverage for serving wireless devices 30. Of course, the network 10 may include a potentially large number of transmission points 24 that are geographically arranged to provide overlapping radio coverage, such that a given wireless device 30 operating at a given geographic location may be within radio range of one, two, or several transmission points 24. As used in this disclosure, the term "network coverage condition" connotes the network coverage experienced by a wireless device 30. The network coverage condition at any given wireless device 30 at any given time is defined by which network transmission points 24, are currently detected by the wireless device 30 and the relative or absolute values of received-signal measurements made by the wireless device 30 for the currently-detected transmission points 24.

Detecting a transmission point 24 comprises, for example, the wireless device 30 detecting one or more downlink signals 26 transmitted by a given transmission point 24. FIG. 2 depicts an example situation where the illustrated wireless device 30 receives downlink signals 26-1 from the transmission point 24-1 and receives downlink signals 26-2 from the transmission point 24-2. As a non-limiting example, the signals by which a wireless device 30 "detects" a transmission point 24 are any one or more of downlink reference signals such as Cell Specific Reference (CRS) signals, synchronization signals, or the like, which are transmitted by the transmission point 24. Such signals may be broadcasted or otherwise transmitted over a coverage area for which the transmission point 24 is configured to provide service. As a further example, the signals in question may be beamformed signals, e.g., beamformed signal generally transmitted by respective transmission points 24, such as periodic transmit beams used to provide synchronization signals or other cell-access information.

The wireless device 30 may be essentially any type of wireless communication apparatus that is configured for operating in the network 10—i.e., configured to send and receive signals according to any of the one or more air interfaces provided by the network 10. As a non-limiting example, the wireless device 30 comprises a 3GPP User Equipment (UE). More broadly, the wireless device 30 comprises a smartphone or other device having wireless communication capabilities, such as a tablet or computer, or other mobile communication device. Further, the wireless device 30 may be intended for use by a human user and/or may be configured for Machine-to-Machine (M2M) operation, in other examples, the wireless device 30 comprises an Internet-of-Things (IoT) device.

In an example embodiment, the wireless device 30 includes one or more antennas 40 that are configured for transmitting signals to the network 10 and for receiving signals from the network 10, i.e., receiving signals transmitted by transmission points 24 in the network 10. Of course, the specific transmission point 24 or points 24 from which the wireless device 30 receives signals with sufficient signal strength for detection and/or connection depends on the current location of the wireless device 30.

The wireless device 30 further includes radio circuitry 44 associated with transmit/receive antenna(s) 40, processing circuitry 46 that is operatively associated with the radio circuitry 44, and storage 48 comprising one or more types of computer-readable media. Much like the processing circuitry 16 included in an example radio network node 12, the processing circuitry 46 comprises fixed circuitry or programmed circuitry or some combination of fixed and programmed circuitry. In at least one example, the processing circuitry 46 at least in pan comprises one or more digital processing circuits, such as microprocessors, digital signal processors, etc., that are configured to carry out operations detailed herein, based on their execution of computer program instructions contained in a stored computer program.

Correspondingly, the storage 48 in one or more embodiments holds one or more computer programs 50 containing such instructions. In at least some embodiments, the storage 48 further stores configuration data 52, e.g., configuration data received from the network 10 or configuration data determined by the wireless device 30, e.g., based on signaling received from the network 10, or otherwise provisioned in the wireless device 30. The storage 48 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 48 may store any suitable data, instructions, or information, including software and encoded logic; utilized by the wireless device 30. Further, the storage 48 may be used to store any calculations made by the processing circuitry 46 and/or any data received via the radio circuitry 44, which includes one or more radiofrequency transmitters and receivers configured for operation according to any one or more of the RATs used by the network 10. Such radio circuitry 44 includes, for example, radio front-end circuitry that includes various filters and amplifiers and is connected to antenna(s) 40 and the processing circuitry 46 and is configured to condition signals communicated between the antenna(s) 40 and the processing circuitry 46.

With the above example details in mind, in one or more embodiments, a wireless device 30 according to an example embodiment is configured for operation in a wireless communication network 10 and includes radio circuitry 44 that is configured to receive signals from the network 10 and transmit signals to the network. The device 30 further includes processing circuitry 46 that is operatively associated with the radio circuitry 44 and configured to evaluate signals received at the device 30 from one or more respective transmission points 24 in the network 10 that are currently detected by the wireless device 30, to determine whether a network coverage condition currently experienced by the wireless device 30 satisfies a predefined coverage condition that is characteristic of airborne operation of the device. Responsive to determining that the predefined coverage condition is satisfied, the processing circuitry 46 is configured to generate a measurement report indicating satisfaction of the predefined coverage condition and is configured to transmit the measurement report to the network 10 via the radio circuitry 44.

The processing circuitry 46 may or may not know or recognize the predefined coverage condition as being characteristic of airborne operation of the device 30. For example, while the network 10 may know or associate the predefined coverage condition with airborne operation, the wireless device 30 need only be configured to recognize when its current, existent network coverage condition satisfies the predefined coverage condition. As non-limiting examples, the predefined coverage condition comprises any one or more of: the device 30 detecting more than the expected number of transmission points 24, the device 30 detecting one or more transmission points 24 that it would not be expected to detect during ground level operation at its current geographic location, the device 30 not detecting one or more transmission points that should be detected during ground level operation at its current geographic location, and the device 30 experiencing relative or absolute values of signal measurements for the detected transmission points 24 that are outside of the ranges that would be expected for ground level operation at its current geographic location. The ranges and/or relationships between measured signal values may be defined with respect to a serving or reference transmission point 24.

Thus, in one or more embodiments, the predefined coverage condition can be understood as a coverage condition that could not, or at least likely would not exist, were the device 30 operating at ground level at its current location. There may be different predefined coverage conditions associated with different elevations or ranges of elevations; and the specific transmission points and/or relative or absolute values of signal measurements that define the predefined coverage condition may be learned from, e.g., field testing and characterization, wherein drones or other devices 30 are operated in various geographic locations at various elevations. The predefined coverage conditions or the data needed to determine them may be provided to respective ones of the radio network nodes 12 via the network interface 32, e.g., from a node operating in the network 28.

Correspondingly, in one or more embodiments, the processing circuitry 46 of the example wireless device 12 is configured to receive configuration signaling from the network 10 that defines the predefined coverage condition. Again, the network coverage condition at the wireless device 30 at any given time is defined by which network transmission points 24 are currently detected by the device 30 and the relative or absolute values of received-signal measurements made by the device 30 for the currently-detected transmission points 24. The device 30 in an example embodiment deems a given transmission point 24 to be detected if it receives signals from the transmission point 24 at or above some defined minimum strength or quality threshold.

In additional embodiments or in extension of the embodiments described above, the processing circuitry 46 is configured to perform at least one of: exclude any currently-detected transmission point 24 from consideration when evaluating the network coverage condition, unless the transmission point 24 belongs to a whitelist of transmission points 24 received from the network 10; and exclude any currently-detected transmission point 24 from consideration when evaluating the network coverage condition, if the transmission point 24 belongs to a blacklist of transmission points 24 received from the network 10. For example, the predefined coverage condition may be the device 30 detecting more than a threshold number of transmission points 24. By providing the device 30 with blacklists and/or whitelists, the network 10 controls which transmission points 24 are counted by device 30 towards the threshold number. In a non-limiting case, the network 10 uses blacklists to exclude one or more transmission points 24 that the device 30 would be expected to detect during ground level operation at its current location and/or uses whitelists to identify one or more transmission points 24 that the device 30 would not be expected to see during ground level operation at its current location.

More broadly, the predefined coverage condition can be understood in one or more embodiments as a network coverage condition expected for the current location of the device 30, at a defined height or range of heights above ground level. For example, the predefined coverage condition is defined as a received signal strength or quality for a specified number of transmission points 24 exceeding a defined threshold or being in a defined range. The threshold and range evaluations may be referenced to absolute values or to relative values, e.g., such that the device 30 generates and sends a measurement report when the signal strengths or qualities of the transmission points 24 it detects satisfy a predefined relationship. In a specific example, die predefined coverage condition is defined as a received signal strength or quality for a specified number of transmission points 24 falling within a defined range of a reference strength or quality, the reference strength or quality corresponding to, a serving or reference transmission point 24 for the device 30.

In the same or other embodiments, the predefined coverage condition is defined as one or more of: the device 30 detecting one or more transmission points 24 that normally would not be detected for ground-level operation at a current location of the device 30; the device 30 detecting a greater number of transmission points 24 than normally would be detected for ground-level operation at the current location of the device 30; and the received-signal measurements made by die device 30 for the currently-detected transmission points 24 having relative or absolute values characteristic of the device 30 being at a defined height or range of heights above ground level.

Figures 3, 4:
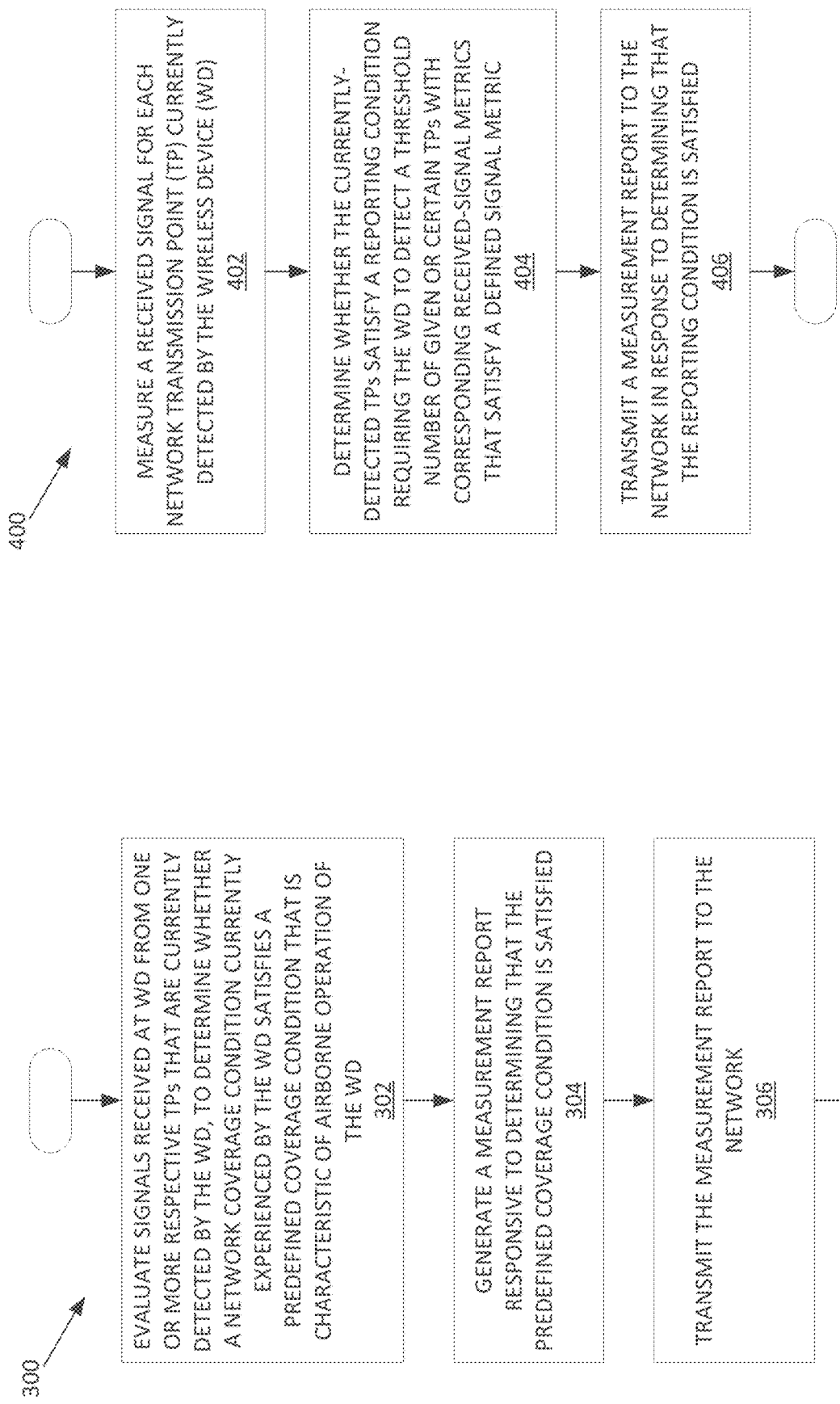
FIG. 3 is a logic flow diagram of one embodiment of a method of operation at a wireless device operating in a wireless communication network, such as in the example network of FIG. 2.
FIG. 4 is a logic flow diagram of another embodiment of a method of operation at a wireless device operating in a wireless communication network, such as in the example network of FIG. 2.

FIG. 3 illustrates an example method 300 performed by a wireless device 30, e.g., a wireless device 30 performs the illustrated steps or operations based on the execution of computer program instructions by its included processing circuitry 46. Other aspects to appreciate regarding the illustrated method 300 is that the wireless device 30 may perform all or part of the method 300 on an ongoing or repeated basis and may perform all or part of the method 300 as part, of other operations. For example, the wireless device 30 may be configured to perform cell searching or transmission point, detection on an ongoing or triggered basis and as part of such operations may check to see whether its current network coverage condition satisfies a predefined coverage condition.

With these points in mind, the example method 300 includes the wireless device 30 evaluating (Block 302) signals received at the device 30 from one or more respective transmission points 24 in the w ireless communication network 10 that are currently detected by the device 30, to determine whether a network coverage condition currently experienced by the device 30 satisfies a predefined coverage condition that is characteristic of airborne operation of the device 30. The method 300 further includes the device 30, in response to determining that the predefined coverage condition is satisfied, generating (Block 304) a measurement report indicating satisfaction of the predefined coverage condition, and transmitting (Block 306) the measurement report to the network 10.

The device 30 may or may not recognize that the predefined coverage condition is characteristic of airborne operation; it is sufficient that the device 30 be operative to recognize when its current network coverage condition satisfies the predefined coverage condition and be further operative to generate and transmit a measurement report to the network 10 in response to such recognition. The measurement report explicitly or implicitly indicates to the network 10 that the device 30 is experiencing network coverage characteristic of airborne operation, allowing the network 10 to one or more responsive actions.

The method 300 in one or more embodiments includes the device receiving configuration signaling from the network 10 that defines the predefined coverage condition. The predefined coverage condition may be defined according to any of the earlier described examples.

The method 300 may further include at least one of: the device 30 excluding any currently-detected transmission point 24 from consideration when evaluating the network coverage condition, unless the transmission point 24 belongs to a whitelist of transmission points 24 received from the network 10; and the device 30 excluding any currently-detected transmission point 24 from consideration when evaluating the network coverage condition, if the transmission point 24 belongs to a blacklist of transmission points 24 received from the network 10.

FIG. 4 illustrates another device-side method 400 that may be understood as representing further details for implementing the method 300. The method 400 includes a wireless device 30 measuring (Block 402) a received signal for each network transmission point 24 that is currently detected by the device 30. The method 400 further includes the device 30 determining (Block 404) whether the currently-detected transmission points satisfy a reporting condition, where the reporting condition requires the device 30 to detect a threshold number of given or certain transmission points 24 with corresponding received-signal metrics that satisfy a defined signal metric. For example, the received-signal metrics comprise received-signal quality or strength values, as measured by the device 30, and the defined signal metric comprises a defined threshold or set of thresholds, defined in terms of absolute or relative measurement values.

The method 400 further includes the device 30 transmitting (Block 406) a measurement report to the network 10, in response to determining that the reporting condition is satisfied. The measurement report may explicitly indicate such satisfaction, or it may implicitly indicate such satisfaction, e.g., by conveying the involved measurement values or indications thereof, such that the radio network node(s) 12 in the network 10 that receive the report can recognize satisfaction of the reporting condition.

Example network-side operations supporting the above device-side operations are provided by a radio network node 12 that is configured for operation in a wireless communication network 10 having a plurality of transmission points 24 for serving wireless devices 30. The example radio network node 12, e.g., as illustrated in FIG. 2, includes radio circuitry 14 configured to send signals via one or more of the transmission points 24 for reception by wireless devices 30 operating in a coverage area of the radio network node 12, and receive signals transmitted from such wireless devices 30. The example radio network node 12 further includes processing circuitry 16 that is operatively associated with the radio circuitry 14 and configured to carry out certain processing operations.

Specifically, the processing circuitry 16 is configured to determine a predefined coverage condition for a wireless device 30 served by the radio network node 12 via one or more of the transmission points 24. The predefined coverage condition is a network coverage condition that, for a current location of the wireless device 30, is indicative of airborne operation of the wireless device 30. The processing circuitry 16 is further configured to send signaling to the wireless device 30, to configure the wireless device 30 to transmit a measurement report responsive to determining that the network coverage condition of the wireless device 30 satisfies the predefined coverage condition.

In an example embodiment, the processing circuitry 16 is configured to "determine" the predefined coverage condition for the device 30 as a function of the current location of the device 30, which may be determined by the node 12, with or without assistance from the device 30, or which may be indicated to die node 12 by another node in the network 10. For example, the node 12 stores or has access to information comprising a number of predefined coverage conditions, where the different conditions correspond to different geographic locations or ranges of locations for which the node 12 provides radio coverage. Thus, the node 12 uses the most recent location information of the device 30 to look up the corresponding predefined coverage condition applicable to that location. Further, there may be more than one predefined coverage condition applicable to the location, e.g., different predefined coverage conditions corresponding to different ranges of elevation above ground level. More broadly, it shall be understood that the radio network node 12 in one or more embodiments is configured with or otherwise has access to one or more data sets, each associated with a different geographic location or range of locations relevant to the coverage areas in the network 10 that are serviced by the node 12, with each data set containing information defining the predefined coverage information that is indicative of airborne operation by a wireless device 30 in the corresponding coverage area.

In further examples, or in extension of the above examples, the processing circuitry 16 is further configured to perform at least one of: determine a blacklist of transmission points 24 that are ineligible for consideration by a wireless device 30 when determining whether a predefined coverage condition is satisfied and send signaling indicating die blacklist for reception by the wireless device 30, the blacklisted transmission points 24 being one or more transmission points 24 normally detectable by wireless devices 30 operating at ground level at the current location of the device 30 in question; and determine a whitelist of transmission points 24 that are eligible for consideration by the device 30 when determining whether the predefined coverage condition is satisfied and send signaling indicating the whitelist for reception by the device 30, the whitelisted transmission points 24 being one or more transmission points 24 not normally detectable by wireless devices 30 operating at ground level at the current location of the device 30 in question.

Further, in one or more example embodiments, in response to the radio network node 12 receiving a measurement report of the type described herein one or more times from a wireless device 30, the processing circuitry 16 is configured to deem the device 30 to be engaged in airborne operation and modify at least one of handover control and transmit power control by the radio network node 12 for the device 30 to account for the airborne operation. For example, the processing circuitry 16 is configured to cause the radio network node 12 to cease serving the device 30. Such service cessation reflects the advantageous recognition that a wireless device 30 in airborne operation may cause unexpected interference, e.g., at potentially distant transmission points 24 in the network 10, or at other devices that would not experience such interference if the device 30 were operated at ground level.

In other embodiments, or in dependence on the specific operating conditions or coverage area(s) involved, the processing circuitry 16 is configured to modify at least one of handover control and transmit power control by the network 10 for a wireless device 30 that has sent a measurement report indicative of airborne operation of the device 30, to account for the airborne operation. For example, the radio network node 10 may change handover targets for the device 30 (i.e., change which radio network nodes 12/transmission points 24 are candidates for serving the device 30), or change one or more signal thresholds used to trigger handover of the device 30, e.g., to cause an earlier handover of the device 30. Additionally, or alternatively the radio network node 12 may apply more aggressive transmit power limitations to the device 30, to reduce interference elsewhere in the network 10 that might otherwise arise from airborne operation of the device 30.

FIG. 5 illustrates an example method 500, e.g., as performed by a radio network node 12 like the one illustrated in FIG. 2. Of course, the method 500 also may be performed by a radio network node 12 having alternative arrangements of processing and communication circuitry, and it should be understood that the method 500 may be performed on an ongoing basis, or otherwise be repeated, and may be included as part of other, ongoing operations carried out by a radio network node 12. Further, the method 500 may be implemented in whole or in part based on the execution of stored computer program instructions by the processing circuitry 16 of a radio network node 12.

Broadly, the example method 500 is performed in a radio network node 12 configured for operation in a wireless communication network 10 having a plurality of transmission points 24 used for serving wireless devices 30. The method 500 includes determining (Block 502) a predefined coverage condition for a wireless device 30 served by the node 12 via one or more of the transmission points 24. The predefined coverage condition is a network coverage condition that, fora current location of the device 30, is indicative of airborne operation of the wireless device 30. The method 500 further includes the radio network node 12 sending (Block 504) signaling to configure the device 30 to transmit a measurement report responsive determining that the network coverage condition of the device 30 satisfies the predefined coverage condition.

In at least one example, the same predefined coverage condition may be signaled to any wireless device 30 that is served by the radio network node 12 and operated at the same location or at least operated in some range of locations having a commonly defined or associated network coverage condition that is characteristic of any given wireless device 30 being operated at some defined elevation or range of elevations within the range of locations. Correspondingly, the radio network node 12 may signal different predefined coverage conditions to respective wireless devices 30 that are operated in different coverage areas or in different ranges of locations that are, respectively, associated with or mapped to different predefined coverage conditions.

The method 500 may further include the radio network node 12 performing at least one of: determining a blacklist of transmission points 24 that are ineligible for consideration by a wireless device 30 when determining whether the predefined coverage condition is satisfied at the wireless device 30 and sending signaling indicating the blacklist for reception by the wireless device 30, where the blacklisted transmission points 24 are one or more transmission points 24 normally detectable by wireless devices 30 operating at ground level at the current location of the device 30 in question; and determining a whitelist of transmission points 24 that are eligible for consideration by the device 30 when determining whether the predefined coverage condition is satisfied and sending signaling indicating the whitelist for reception by the device 30, where the whitelisted transmission points 24 are one or more transmission points 24 not normally detectable by wireless devices 30 operating at ground level at the current location of the device 30 in question.

Still further, in one or more embodiments, the method 500 includes, in response to the radio network node 12 receiving the measurement report one or more times from the device 30, deeming the device 30 to be engaged in airborne operation and modifying at least one of handover control and transmit power control by the network 10 for the device 30 to account for the airborne operation. Alternatively, the method 500 includes, in response to the radio network node 12 receiving the measurement report, one or more times from the device 30, deeming the device 30 to be engaged in airborne operation and correspondingly ceasing serving the device 30 from the radio network node 12.

FIG. 6 illustrates an example modular or functional arrangement 600 of a wireless device 30 according to one or more embodiments. The device 30 includes a measurement module 602 that is configured to make one or more kinds of measurements on signals received by the device 30, e.g., received signal quality or strength measurements on downlink signals used by the device 30 to "detect" and evaluate respective transmission points 24 in the network 10. The device 30 further includes a determination/evaluation module 604 that is configured to evaluate such signals as received at the wireless device 30 from one or more respective transmission points 24 in the network 10 that are currently detected by the device 30, to determine whether a network coverage condition currently experienced by the device 30 satisfies a predefined coverage condition that is characteristic of airborne operation of the device 30. For example, the measurement module 602 provides signal measurements to the determination/evaluation module 604, which then evaluates them.

The example device 30 further includes a transmit module 606. In response to the determination/evaluation module 604 determining that the predefined coverage condition is satisfied, the transmit module 606 is configured to generate a measurement report indicating satisfaction of the predefined coverage condition, and transmit the measurement report to the network 10, e.g., via the radio circuitry 44 of the device 30.

Similarly, FIG. 7 illustrates an example modular or functional arrangement 700 of a radio net work node 12. The node 12 includes a determination/configuration module 702, which is configured to determine a predefined coverage condition for a wireless device 30 served by the node 12 via one or more of the transmission points 24. The predefined coverage condition is a network coverage condition that, for a current location of the device 30, is indicative of airborne operation of the device 30. The example node 12 further includes a signaling module 704 that is configured to send signaling to configure the device 30 to transmit a measurement report responsive determining that the network coverage condition of the device 30 satisfies the predefined coverage condition.

Such signaling may be sent, for example, as Radio Resource Control (RRC) signaling. Further, such signaling may be sent using extended or modified versions of signaling defined by one or more wireless communication standards, such as one or more standards promulgated by the 3GPP. One such example involves extending or modifying the measurement framework defined for Long Term Evolution (LTE) networks, as specified in the technical specification TS 36.331 included in Release 14 by the 3GPP. Within the measurement framework defined by TS 36.331, a UE reports measurement information in accordance with the measurement configuration provided to it by the supporting LTE network, i.e., the supporting E-UTRAN. The signaling is provided to a UE operating in the RRC_CONNECTED state using RRCConnectionReconfiguration or RRCConnectionResume messages.

More broadly, the measurement framework provides for configuring the UE to make intra-frequency and inter-frequency measurements, inter-RAT measurements, measurements with respect to specific cells, e.g., Primary Cells (PCells) and/or Secondary Cells (SCells) when operating in multi-connectivity scenarios, such as Coordinated Multi-Point (CoMP) operation or operation in Dual Connectivity or Carrier Aggregation scenarios. One or more implementations herein extend the measurement framework to include one or more Information Elements (IEs) that are used to specify to any given wireless device 30 the predefined coverage condition and/or to configure the measurements made by the device 30 to enable the device 30 to undertake and make the radio measurements necessary for the device 30 to evaluate whether the predefined coverage condition is satisfied at the device 30. In such embodiments, the MeasObject structure provided within the measurement framework defined by TS 36.331 may be extended or modified so that a radio network node 12 can configure a wireless device 30 to make measurements on signals received from respective transmission points 24 and determine whether those measurements satisfy a predefined coverage condition.

In one or more example embodiments, new measurement reporting triggers are defined, such that a UE or other wireless device 30 transmits a measurement report when its network coverage conditions satisfy a defined reporting condition—i.e., satisfy a predefined coverage condition that is characteristic of airborne operation of the device 30 at its current location. In one example, a UE triggers a measurement report when "X" number of cells are above a first threshold and below a second threshold.

Here, "X" is an integer number, e.g., a number that is greater than or equal to two, three, or some other specified value. Further, "cell" may be understood to mean, as an example, a carrier signal or other downlink signal associated with particular radio or air interface resources used to provide network coverage within a corresponding coverage, area. A given transmission point 24 may provide one cell, or may provide more than one cell, or may otherwise provide coverage in one or more respective areas and correspondingly transmit one or more reference or other signals for detection by wireless devices 30 operating in such areas.

As another example of a new reporting trigger, a UE may be configured to trigger a measurement report when "X" number of cells are within a threshold compared to a reference value. The reference value may be determined by the UE based on measurements made for a serving or reference cell, e.g., a PCell, or it may be determined as the average of all detected cells/transmission points 24, or some subset of them.

In another example, a UE triggers a measurement report when certain separately listed cells, e.g. whitelisted cells are above a first threshold and below a second threshold. Alternatively, reporting is triggered when certain non-listed cells, e.g. non-blacklisted cells are above a first threshold and below a second threshold.

In yet another example, a UE is configured to trigger a measurement report if certain separately listed cells, e.g. whitelisted cells are within a threshold compared to a reference value. Alternatively, when certain non-listed cells, e.g. non-blacklisted cells are within a threshold compared to a reference value.

Continuing with the example LTE context, an eNB is configured to configure a given UE to send reports to the eNB in situations where the UE experiences coverage conditions that are indicative of airborne operation of the UE. In other words, the eNB advantageously configures the UE to generate and send a measurement report whenever the UE is generating/experiencing interference to/from non-serving eNBs and/or other UEs. The eNB may then take appropriate actions to reduce such interference, e.g. perform a handover to a more appropriate cell, use power control mechanisms to reduce the interference, refuse to further serve the UE, etc.

Such operations may involve the UE comparing how "good" or "bad" cells, determining whether a cell is good or better than another cell or determining that a cell is bad or worse than another cell may be based on relative or absolute evaluations of the signal strength and/or signal quality determined for the cell(s) being evaluated.

In a more detailed example, an eNB configures a UE such that the UE is configured to trigger a measurement report to the eNB in response to X number of ceils being within a certain range. The range may be defined by two thresholds, e.g., X number of ceils are better than a threshold1 and worse than a threshold2. For example; the UE shall trigger a report when X cells have a signal strength above −90 dBm and below −70 dBm. Again, it should be understood that "cell" in a broad sense can be understood as a given downlink detection signal, e.g., a reference signal, synchronization signal, or other such signal transmitted by a given transmission point 24 for a corresponding coverage area served by the transmission point 24.

In another more detailed example, the eNB configures the UE to trigger a measurement report responsive to the UE detecting that X number of cells are "close to" a reference value. For example, the UE is configured by eNB to trigger a measurement report in response to X number of cells being within a range close to a reference value. For example, the UE considers a cell to be within the range if a signal measurement made for the cell is above the reference value minus a delta value, or below the reference value plus a delta value. The reference value may be, for example, −80 dBm and the delta values may be +10 dB and −10 db. Hence any cell that is above −90 dBm (=−80 dBm−10 dB) and below −70 dBm (=−80 dBm+10 dB) is considered "close to" the reference cell, for report-triggering purposes.

An additional or alternative embodiment involves the eNB configuring the UE to trigger a measurement report when certain cells are seen by the UE. That is, the UE triggers a report when triggering conditions are met for a certain set of cells. The set of cells may be any cell which in general would not be seen by UE that is operating at ground level at the current location. Hence, the UE seeing any one or more of the identified cells can be taken by the eNB as an indication that the UE is operating at an elevation or range of elevations above ground level.

One potential way to implement the above logic is to use a blacklist where the UE triggers a report when conditions are fulfilled for cells other than the cells in the blacklist. The blacklist may then consist of cells that a UE would see, or likely would see, if operated at ground level in the current location. The UE should then use a blacklist applicable not for a frequency/measurement object (as in current technical specifications), but rather tor a report configuration allowing the UE to use different blacklists for different report configurations (or potentially no blacklist for a first report configuration while using a blacklist for another report configuration).

In current LTE specifications, it is possible to configure a blacklist per measurement object, which are configured per frequency. However, in some of the scenarios contemplated herein, the measurement framework is modified so that the UE applies a blacklist per measurement event or per measurement report configuration. This approach accommodates certain scenarios, such as where the UE in question is currently served on frequency FI and it is desired to determine whether the UE can detect cells on FI which are far away from its serving eNB. In such a scenario, it may not be suitable to blacklist the serving cell using conventional approaches to blacklisting, because the UE would then not consider the serving cell when evaluating any measurement events (even other events which may be for other purposes such as e.g. handover). Consequently, it is contemplated herein for an eNB or other network node to configure a blacklist per report configuration.

In another implementation, the UE is configured such that it considers a specified blacklist(s) only when evaluating certain events. Similarly, the UE may be configured to consider or apply a network-specified whitelist only to certain measurement events. To indicate to the UE that it shall consider whitelist(s) and/or blacklists) only for certain measurement events, the eNB may include one or more IBs or indicators in the configuration signaling sent to the UE. As such, the UE may be configured to make network, coverage evaluations that are specifically tailored to the UE detecting and reporting network coverage conditions that are indicative of airborne operation of the UE.

Equivalently, the UE can be configured to evaluate its network coverage conditions in terms of "beams" received from respective transmission points 24. Thus, the triggering condition can be defined as the UE seeing more than a threshold number of beams, seeing beams that it should not see, or experiencing received-signal levels or qualities for given or certain beams that satisfy a defined set of relative or absolute measurement criteria.

For example, for ground-level operation at a given location, the UE may be expected to receive reference or other signals from its serving transmission point 24 at a higher signal level or quality than the reference or other signals it receives from one or more neighboring transmission points 24. However, depending upon the radiation patterns used by the respective transmission points 24, the UE may experience decreasing signal levels or qualities for its serving transmission point 24 as its elevation increases. Hence, a network node may configure the UE to send a measurement report responsive to determining that the signal level or quality of its serving transmission point 24 has fallen to a certain range or threshold, while the signal level or quality of one or more of the neighboring transmission points 24 has risen to a certain range or threshold, which may be defined relative to the serving transmission point 24.

More broadly, the signal quality or level evaluations made by the UE may be made with respect to a reference value. The reference value may be taken from a serving transmission point 24 or from any other transmission point 24 designated as a reference. Alternatively, the reference value may be calculated or otherwise determined by the UE, e.g., based on averaging the signal levels or qualities it experiences with respect to all detected transmission points 24 or some selected or designated subset of the detected transmission points 24. For example, the UE may determine the reference value from one or more cells in a Master Cell Group (MCG) or determine the reference value from its serving PCell and one or more SCells being used to serve the UE.

Notably, modifications and other embodiments of the disclosed inventions) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless device configured for operation in a wireless communication network, the method comprising:
   receiving configuration signaling from the wireless communication network, indicating, as a predefined network coverage condition, one or more transmission points of the wireless communication network that the wireless device would be expected to detect if operating at a certain elevation or range of elevation above ground level in a particular geographic area, and further indicating corresponding signal levels at which the wireless device would be expected to detect the one or more transmission points; and
   while operating in the particular geographic area, determining whether a current network coverage condition, as currently detected by the wireless device, matches the predefined network coverage condition, and, responsive to the current network coverage condition matching the predefined network coverage condition, transmitting a measurement report to the network.

2. The method of claim 1, wherein the current network coverage condition at the wireless device is defined by which network transmission points are currently detected by the wireless device and the relative or absolute values of received-signal measurements made by the wireless device for the currently-detected transmission points.

3. The method of claim 1, wherein, for determining the current network coverage condition, the wireless device considers only whitelisted transmission points or excludes blacklisted transmission points from consideration.

4. A wireless device configured for operation in a wireless communication network, the wireless device comprising:
   radio circuitry configured to receive signals from the wireless communication network and transmit signals to the network; and
   processing circuitry operatively associated with the radio circuitry and configured to:
      receive configuration signaling from the wireless communication network, indicating, as a predefined network coverage condition, one or more transmission points of the wireless communication network that the wireless device would be expected to detect if operating at a certain elevation or range of elevation above ground level in a particular geographic area, and further indicating corresponding signal levels at which the wireless device would be expected to detect the one or more transmission points; and
      while operating in the particular geographic area, determine whether a current network coverage condition, as currently detected by the wireless device, matches the predefined network coverage condition, and, responsive to the current network coverage condition matching the predefined network coverage condition, transmit a measurement report to the network.

5. The wireless device of claim 4, wherein the current network coverage condition at the wireless device is defined by which network transmission points are currently detected by the wireless device and the relative or absolute values of received-signal measurements made by the wireless device for the currently-detected transmission points.

6. The wireless device of claim 4, wherein, for determining the current network coverage condition, the processing circuitry is configured to consider only whitelisted transmission points or excludes blacklisted transmission points from consideration.

7. A method in a radio network node configured for operation in a wireless communication network having a plurality of transmission points used for serving wireless devices, the method comprising:

determining a predefined network coverage condition as one or more of the transmission points that a wireless device would be expected to detect if operating at a certain elevation or range of elevation above ground level in a particular geographic area, and further as corresponding signal levels at which the wireless device would be expected to detect the one or more transmission points; and sending configuration signaling to configure the wireless device to transmit a measurement report responsive to determining that a current network coverage condition of the wireless device while operating in the particular geographic area matches the predefined network coverage condition.

8. The method of claim 7, further comprising sending whitelist information to the wireless device for the wireless device to consider only whitelisted transmission points when determining the current network coverage condition or sending blacklist information to the wireless device for the wireless device to exclude blacklisted transmission points from consideration when determining the current network coverage condition.

9. The method of claim 7, further comprising, in response to receiving the measurement report one or more times from the wireless device, deeming the wireless device to be engaged in airborne operation and modifying at least one of handover control and transmit power control by the network for the wireless device to account for the airborne operation.

10. The method of claim 7, further comprising, in response to receiving the measurement report one or more times from the wireless device, deeming the wireless device to be engaged in airborne operation and correspondingly ceasing serving the wireless device from the radio network node.

11. A radio network node configured for operation in a wireless communication network having a plurality of transmission points for serving wireless devices, the radio network node comprising:

radio circuitry configured to send signals via one or more of the transmission points for reception by wireless devices operating in a coverage area of the radio network node, and receive signals transmitted from such wireless devices; and processing circuitry operatively associated with the radio circuitry and configured to:

determine a predefined network coverage condition as one or more of the transmission points that a wireless device would be expected to detect if operating at a certain elevation or range of elevation above ground level in a particular geographic area, and further as corresponding signal levels at which the wireless device would be expected to detect the one or more transmission points; and send configuration signaling to configure the wireless device to transmit a measurement report responsive to determining that a current network coverage condition of the wireless device while operating in the particular geographic area matches the predefined network coverage condition.

12. The radio network node of claim 11, wherein the processing circuitry is further configured to send whitelist information to the wireless device for the wireless device to consider only whitelisted transmission points when determining the current network coverage condition or send blacklist information to the wireless device for the wireless device to exclude blacklisted transmission points from consideration when determining the current network coverage condition.

13. The radio network node of claim 11, wherein, in response to the radio network node receiving the measurement report one or more times from the wireless device, the processing circuitry is configured to deem the wireless device to be engaged in airborne operation and modify at least one of handover control and transmit power control by the radio network node for the wireless device to account for the airborne operation.

14. The radio network node of claim 11, wherein, in response to the radio network node receiving the measurement report one or more times from the wireless device, the processing circuitry is configured to deem the wireless device to be engaged in airborne operation and correspondingly cause the radio network node to cease serving the wireless device.

* * * * *